United States Patent Office

2,927,100
Patented Mar. 1, 1960

2,927,100

METHOD OF PREPARING A WATER SOLUBLE POLYMER FROM A WATER INSOLUBLE CONJUGATED DIENE POLYMER

Peter J. Canterino and Lon T. Smith, Bartlesville, Okla., assignors to Phillips Petroleum Company, a corporation of Delaware No Drawing. Application March 21, 1957
Serial No. 647,505

5 Claims. (Cl. 260—83.5)

This invention relates to water soluble polymers. In a further aspect, this invention relates to a method of preparing water soluble polymers.

Many water soluble polymeric materials are known. However, some of these materials have the undesirable property of being unstable at elevated temperatures. Such polymeric materials include methyl cellulose, and carboxymethyl cellulose. The natural polymers have been used for many applications including drilling muds, textile sizes, and as thickening agents. While they are extremely valuable in this respect, their lack of stability at elevated temperatures is a decided drawback.

The following are objects of our invention.

An object of this invention is to provide water soluble polymers which are stable at elevated temperatures. A further object of this invention is to provide a method of preparing water soluble polymers. A further object of this invention is to provide water soluble polymers suitable for use in drilling muds and as oil well plugging agents.

Other objects and advantages of this invention will become apparent to one skilled in the art upon reading the accompanying disclosure.

We have discovered that salts of polymers which are water soluble can be made from water insoluble polymers of conjugated dienes by reacting such polymers with hydrogen peroxide in the presence of an acidic catalyst under carefully controlled conditions in order to introduce hydroxyl and carboxyl substituents into the original polymer. The ammonium and alkali metal salts of these hydroxyl and carboxyl containing polymers are water soluble. For example, liquid or rubbery homopolymers of 1,3-butadiene can be converted to water soluble polymers. The reaction conditions are quite specific since it is necessary to avoid cross linking which will result in a water insoluble polymer.

More specifically, the invention resides in treating a diene homopolymer or copolymer with hydrogen peroxide and a catalyst such as formic acid at two different temperature levels in the presence of solvents which prevent cross linking. The polymer should not be dried between the first and second step, although it can be removed from the solvent before the second step is started. The first step of the reaction is carried out at a temperature not to exceed 45° C., preferably 10 to 45° C. while the second step is carried out at a temperature of 50 to 200° C., preferably 50 to 100° C. The reaction time for the first step is from one to 60 hours. The reaction time for the second step is generally from one to 10 hours. In each step, the polymer is in solution in the required solvent in a concentration between one to 10 weight percent, preferably 5 to 10 weight percent.

The products produced by the process of this invention are suitable for applications in drilling muds, as textile sizes, and as thickening agents. In drilling muds, they can be substituted for cellulose and derivatives thereof previously used. Because of a peculiar property of these products, they are also quite suitable as plugging agents in oil wells. In this use, they can be introduced in granular form to plug a desired formation and easily removed when desired. This use of the polymer is based upon the fact that, while they are soluble in water, they are insoluble in an aqueous salt solution.

Catalysts or so-called catalysts for the oxidation reaction with hydrogen peroxide with or without the solvent medium include formic acid, which is generally preferred, and the esters (e.g. methyl, ethyl, propyl esters) of formic acid. Other organic acids such as acetic when used in conjunction with a strong inorganic acid (e.g. $H_2SO_4$) or even with a strong acid of ion exchange resin (e.g. sulfonated polystyrene) can give a satisfactory oxidation.

These catalysts are employed with hydrogen peroxide generally in a 1:1 mol ratio of catalyst to peroxide. Mol ratios of catalyst to peroxide as high as 20 to 1 or as low as 0.1 to 1 are applicable.

The amount of hydrogen peroxide to employ should generally be one mol per double bond unit

to realize maximum economy of the expensive peroxide. However, ratios as high as 10 mols and as low as 0.5 mol of peroxide for each double bond are operable.

The solvents which are used constitute an important feature of our invention. For the first step, a solvent is used which is a solvent for the parent rubber which is essentially non-reactive with the other reagents, the solvent providing control over the reaction. Chloroform, chlorobenzene, carbon tetrachloride, methylene chloride, ethylene chloride, cyclohexane, and benzene are examples of suitable solvents. For the second step, a solvent compatible with the reaction mixture but not reactive therewith is used. Hydroxyl containing solvents meeting the above requirements are those used, including alcohols and polyhydroxy compounds, such as ethylene glycol, propylene glycol, and glycerin are examples of these solvents. We generally use isopropyl alcohol although methyl, ethyl, and tertiary butyl alcohol, with the isopropyl alcohol constitute a preferred group.

After addition of the second solvent, the reaction continues, usually for about one to 10 hours. Subsequently, the reaction mixture is neutralized by the addition of alkaline material. Ammonium and alkali metal carbonates, bicarbonates and hydroxides are suitable, although we prefer to use ammonium, sodium or potassium hydroxide. The alkaline material neutralizes any remaining acid as the catalyst, destroys excess peroxide and forms the metal or ammonium salt of the polymer.

At this stage, the metal or ammonium salt of the polymer is recovered by removal of the solvent. One convenient method for removing the solvent is to add the reaction mixture slowly to boiling water so that the solvent is vaporized. The salt of the polymer, which separates from the aqueous phase, can be recovered by decantation, filtration or other suitable means.

These hydroxyl group-containing solvents which are used in the second step can be present during the first step in some instances. Where this is done, the second solvent must be used in an amount less than that which causes precipitation of the polymer. Where a liquid polymer is used, such as sodium-catalyzed liquid polybutadiene, the solvent for the first step can contain as much as 80 weight percent of the alcoholic solvent. For treatment of a rubbery polymer, the solvent employed in the first step should not contain more than 20 weight percent alcohol.

In every case, the alcohol is added to the reaction mixture prior to the second step (higher temperature) of the reaction period. In some instances, it is added during the first step. The second solvent, in any case, is added to prevent excessive viscosity of the reaction mixture.

It is essential to maintain the viscosity of the solution at or below Z–5 and preferably below Z during the first step of the reaction, this viscosity being measured by means of the Gardner bubble viscometer (heavy body series) as described in Physical and Chemical Examination of Paints, Varnishes, Lacquers, and Colors by Gardner (1933). If the viscosity is allowed to increase beyond the above limits during the reaction, a water insoluble polymer results.

The second step of this reaction, which is carried out at the higher temperature, can be effected simultaneously with the removal of the solvent, such as chloroform, used in the first stage by fractional distillation. This provides a method for removal of this solvent and also for maintaining the desired temperature level in the second step of the reaction. In certain instances, it is necessary to vary the pressure on the system during this distillation to maintain the desired temperature.

Following the second step of the reaction, the product is saponified to destroy any residual peroxide which may be present and also to convert any ester groups which may be present to the corresponding alcohol and acid groups.

The reaction product obtained from the first or low temperature step of the reaction should be maintained in the moist or wet state if it is removed from solution prior to the second step of the reaction. It has been found that if the product from the first step is dried in order to remove solvent and/or water, it becomes insoluble in water, alcohol, and similar solvents and can not be dissolved to carry out the second treating stage.

The water insoluble polymers which serve as starting materials or parent polymers for the water soluble or water dispersible polymers can be homopolymers or copolymers of a conjugated diene containing 4 to 6 carbon atoms. Dienes useful for the preparation of these polymers include 1,3-butadiene, isoprene, piperylene, and 2,3-dimethyl-1,3-butadiene. The copolymers should be prepared from a mixture of monomers containing at least 50 and preferably more than 70 percent by weight of the diene constituent. Excluded, however, are copolymers which contain a free carboxyl group such as can be obtained by copolymerization with monomers containing a free carboxyl group. For example, copolymers of butadiene and acrylic acid are excluded since their use in this disclosed process results in the formation of water insoluble resins due to cross linking. On the other hand, copolymers prepared from esters of these acidic monomers can be used. For example, methyl acrylate or ethyl acrylate can be copolymerized with butadiene and the resulting polymer subjected, after hydroxylation, to hydrolysis to give a water dispersible polymer containing hydroxyl and carboxyl groups. In this case, the carboxyl groups in the final product can result not only from hydrolysis of the ester, but from the oxidation reaction to be described.

The natural and synthetic polymers which can be employed as parent materials can be liquids or solids having a wide range of molecular weight. For example, liquid polybutadiene having a viscosity as low as 400 Saybolt Furol seconds at 100° F. can be used. Rubbery or solid polymers can also be employed. These and other products which are applicable are characterized by having appreciable unsaturation due to the presence in the polymer chain of the

group. It is preferred, generally speaking, and for reasons which will be apparent from the discussion, that the parent materials be moderately free of gel, i.e., not highly cross linked and essentially completely soluble or dispersible in the solvent media for conducting the reaction.

The salt of the polymer made according to the process of our invention has the following properties:

(a) Hydroxyl number 200 or above,
(b) Carboxyl number 10 or above,
(c) Forms true solution or colloidal "solutions" in water and alcohol,
(d) Self-dispersible in water and alcohol,
(e) White solid at room temperature.

The reaction can be considered in part as a hydroxylation reaction with concomitant oxidation. The hydroxylation of organic materials by employing some but not all of the reagents and conditions herein disclosed has been described in U.S. 2,500,599 (1950) to Bergsteinsson and U.S. 2,692,892 (1954) to Hillyer and Edmonds. These patents teach that compounds containing an olefinic linkage between two carbon atoms can be hydroxylated, but water soluble polymers are not produced under the prescribed conditions. In fact if the high temperatures are employed, as taught by Bergensteinsson, to produce aldehydes, ketones, and acids with low molecular weight chemicals, then water-insoluble resins are obtained. Clearly, the teachings of these patents are not applicable for the preparation of water soluble polymers, containing hydroxyl and carboxyl groups, from water-insoluble polymers.

Following the reaction, a crude product can be obtained simply by evaporation of the solvents. A relatively pure product can be obtained by precipitation of the polymer (in its acid form) with acid and washing the polymer with water. The polymer in the acid form is not soluble in water but is soluble in chloroform and isopropyl alcohol and becomes soluble in aqueous solutions upon neutralization with ammonia, alkali metal hydroxides, carbonates, and certain other alkaline reagents such as amines.

Example 1

Polybutadiene rubber was prepared by emulsion polymerization at 41° F. in accordance with the following polymerization recipe:

| | Parts by weight |
|---|---|
| Butadiene | 100 |
| Water | 180 |
| Dresinate 214 [1] | 3.5 |
| KCl | 0.5 |
| KOH | 0.02 |
| Sodium formaldehyde sulfoxylate | 0.1 |
| FeSO$_4$.7H$_2$O | 0.02 |
| Tetrasodium salt of ethylenediamine tetracetic acid | 0.04 |
| Tert-dodecyl mercaptan | 0.8 |
| Diisopropylbenzene hydroperoxide | 0.1 |

[1] Rosin acid soap.

A 60 percent conversion was reached in 7½ hours. Based on the rubber, 0.3 percent of ditertiary butyl hydroquinone was added and, subsequently, 1.0 percent of tris-nonylphenyl phosphite was added. The rubber had a Mooney (ML-4) of 37.

A 27 gram portion of this polybutadiene rubber was dissolved in 450 ml. of chloroform at room temperature. To the chloroform solution of the polymer, 46 grams of 100 percent formic acid and 136 grams of 50 percent hydrogen peroxide was added. After about 2 hours at 45° C., the reaction mixture began to thicken and appeared to start to gel. At this time, 300 ml. of isopropyl alcohol was added and the reaction continued for an additional 2.5 hours at 45° C. The solution was then refluxed at about 60° C. for 4 hours and then cooled. One mol of NaOH in 100 ml. of water was added slowly and the mixture was reheated to 60° C. to distill off the chloroform slowly. During the 4-hour distillation period the temperature rose from about 60 to 75° C. The solution was then added to boiling water and a major portion of the salt of the polymer precipitated from the boiling solution. The supernatant liquor was decanted, and the recovered polymer was dissolved in water. The polymer was precipitated from the aqueous solution by addition of dilute hydrochloric acid. The precipitated polymer was washed and dried and a yield of 24.5 grams was obtained. Analysis of the polymer gave:

Hydroxyl number=224
Acid number=26

*Example II*

Using the rubber of Example I, a solution of 162 grams of this rubber in 3 liters of $CHCl_3$ was prepared at room temperature. To this solution was added 138 grams of formic acid and then 204 grams of 50 percent hydrogen peroxide was added dropwise, being careful not to allow the temperature to rise above about 40° C. The mixture was stirred constantly for 24 hours at room temperature during which time 700 milliliters of $CHCl_3$ was added. At the end of this period, 500 milliliters of isopropyl alcohol was added, the $CHCl_3$ removed by distillation and subsequently an additional 3 liters of isopropyl alcohol was added. The solution was treated with 198 grams of 85 percent potassium hydroxide and stirred for 16 hours. The alcohol solution was poured into boiling water and the salt of the polymer precipitated from the aqueous phase, the solvent being vaporized. One hundred sixty grams of this wet polymer (50 grams of dry polymer) was dispersed in 1200 milliliters of $CHCl_3$ and 42.5 grams of formic acid (98 to 100 percent) was added and then 63 grams of 50 percent $H_2O_2$ was added. Thereafter, 1250 milliliters of isopropyl alcohol was added and the temperature raised to 58 to 60° C. Over a period of five hours, the $CHCl_3$ was distilled off at which time 45 grams of NaOH was added and the solution stirred for two hours. It was then refluxed for 3 hours and slowly poured into boiling water to vaporize the isopropyl alcohol. The salt of the polymer settled to the bottom of the mixture and the supernatant was poured off. When water was added to the settled polymer, it dissolved. The polymer was precipitated from the water solution with hydrochloric acid, removed by filtration and dried in vacuum at 55° C. In the acid form, the polymer was soluble in aqueous sodium hydroxide, chloroform, and dioxane and had a Sward hardness of 70. Analysis of the polymer gave:

Hydroxyl number=320 mg. KOH/g.
Acid number=25 mg. KOH/g.
Oxygen, percent=26.8 percent

*Example III*

The hydroxyl and carboxyl containing polymer which was prepared by Example II was used to treat a water-base drilling fluid. The water-base mud without the polymer contained 20 percent by weight of McCracken clay and had an API Code 29 fluid loss value of 57 ml./30 minutes. When this water-base mud was prepared with 5 lb./bbl. of the sodium salt of the polymer, the water-loss was 19 ml./30 minutes. This water-loss value of the mud was only 11 ml. after the mud had aged for 16 hours at 80° C. For this test, the mud containing the polymer was prepared by adding 5 parts by weight of the polymer to 311 parts by weight of water containing 2 parts by weight of NaOH. After dissolving the polymer in the alkaline solution, 80 parts by weight of the clay was added with stirring. The water-loss value of the mud was then determined.

*Example IV*

In another run, 54 grams of liquid polybutadiene having a viscosity of 1500 Saybolt Furol seconds at 100° F. prepared according to the method of Crouch 2,631,175 was dissolved in 400 milliliters of chloroform. To this solution was added 92 grams of 98 to 100 percent formic acid after which 136 grams of 50 percent hydrogen peroxide was added dropwise to the mixture. The system was maintained at 45° C. or below for 24 hours. Chloroform was then removed by distillation and 400 milliliters of methyl alcohol was added. The polymer was precipitated by pouring into an excess of cool water.

The precipitated polymer was then dissolved in 250 milliliters of isopropyl alcohol.

To this solution was added 30 grams of 98 to 100 percent formic acid and 44 grams of 50 percent hydrogen peroxide added dropwise to the mixture. The temperature was maintained at approximately 40° C. for 26 hours after which it was raised to 60 to 70° C., reflux temperature, for one hour. To this solution was added 30 grams of sodium hydroxide in 100 milliliters of water and the mixture refluxed for 6 hours. The polymer was precipitated from the solution by acidifying with hydrochloric acid. The resulting polymer had a hydroxyl number of 300, an acid number of 46, and was soluble in aqueous sodium hydroxide.

*Example V*

In another run, 60 grams of rubbery polybutadiene similar to the rubber of Example I was dissolved in one liter of chloroform. To this solution was added 50.5 grams of 85 to 90 percent formic acid. After cooling the system to about 10° C. while stirring, 37.4 grams of 30 percent hydrogen peroxide was added dropwise over a period of one and one half hours. Following addition of the peroxide, the solution was allowed to warm up to 35° C. and maintained at that temperature overnight. During the reaction, the solution became very viscous, over Z–5 on the Gardner scale, and the system gelled. The polymer was recovered and, following drying, was insoluble in alcohol, chloroform, and dioxane.

This example demonstrates that the products of our invention are not made unless the two-step operation is used.

As many possible embodiments can be made of this invention without departing from the scope thereof, it is to be understood that all matter herein set forth is to be interpreted as illustrative and not as unduly limiting the invention.

We claim:

1. The method of preparing a water soluble polymer from a water insoluble diene polymer selected from the group consisting of homopolymers and copolymers of a conjugated diene, the copolymers being essentially free from free carboxyl groups and the copolymers containing at least 50 percent by weight of the diene constituents, comprising contacting said polymer with hydrogen peroxide in the presence of an acidic catalyst; maintaining the temperature not over 45° C. during the reaction and, after a time of at least one hour and before the viscosity of the reaction mixture increases to a value of over Z–5 adding an alcoholic solvent compatible with the reaction mixture in an amount of 10 to 100 percent by volume based on the reaction mixture; heating the mixture at a temperature of at least 50° C. for at least one hour; adding sufficient alkaline material to provide an alkaline solution; and recovering the resulting water soluble polymer.

2. The method of preparing a water soluble polymer from a water insoluble diene polymer selected from the group consisting of homopolymers and copolymers of a conjugated diene, the copolymers being essentially free from free carboxyl groups and the copolymers containing at least 50 percent by weight of the diene constituents, comprising dissolving such a diene polymer having a viscosity of at least 400 Saybolt Furol seconds at 100° F. in an organic solvent for said polymer; contacting said polymer in said solvent with hydrogen peroxide in the presence of an acidic catalyst, the amount of hydrogen peroxide being in the range of 0.5 to 10 mols of peroxide per carbon-to-carbon double bond in the polymer and the amount of acidic catalysts being in the range of 0.1 to 20 mols per mol of hydrogen peroxide; maintaining the temperature not over 45° C.

during the reaction and, after a time of at least one hour and before the viscosity of the reaction mixture increases to a value of over Z-5, adding an alcoholic solvent compatible with the reaction mixture in an amount of 10 to 100 percent by volume based on the reaction mixture; heating the mixture at a temperature of 50 to 200° C. for 1 to 10 hours; adding sufficient aqueous alkali metal hydroxide to provide an alkaline solution; removing solvent from the reaction mixture and recovering the resulting water soluble polymer.

3. The method of claim 2, wherein said alcoholic solvent is selected from the group consisting of methyl alcohol, ethyl alcohol, isopropyl alcohol and tertiary butyl alcohol.

4. The method of preparing a water soluble polymer which comprises dissolving rubbery polybutadiene in chloroform; adding formic acid to the polymer solution; adding hydrogen peroxide while maintaining the reaction mixture at a temperature not over 45° C.; maintaining a temperature of not over 45° C. for a time in the range of 2 to 10 hours; adding isopropyl alcohol in an amount of from 10 to 100 percent by volume of the reaction mixture; maintaining the temperature in the range of 50 to 75° C. for 1 to 10 hours; cooling to room temperature; adding sufficient aqueous sodium hydroxide to destroy excess hydrogen peroxide and to neutralize the formic acid; distilling off the major portion of the chloroform, pouring the polymer solution into boiling water to vaporize remaining chloroform and to precipitate the polymer; recovering the polymer and dissolving the same in water; precipitating the polymer by the addition of hydrochloric acid; and recovering and drying the polymer.

5. The method of preparing a water soluble polymer from a water insoluble diene polymer selected from the group consisting of homopolymers of conjugated dienes containing 4 to 6 carbon atoms and copolymers of conjugated dienes containing 4 to 6 carbon atoms and copolymerizable monomers selected from the group consisting of methylacrylate and ethylacrylate which comprises contacting said polymer with hydrogen peroxide in the presence of an acidic catalyst; maintaining the temperature not over 45° C. during the reaction and, after a time of at least one hour and before the viscosity of the reaction mixture increases to a value of over Z-5 adding an alcoholic solvent compatible with the reaction mixture in an amount of 10 to 100 percent by volume based on the reaction mixture; heating the mixture at a temperature of at least 50° C. for at least one hour; adding sufficient alkaline material to provide an alkaline solution; and recovering the resulting water soluble polymer.

References Cited in the file of this patent

UNITED STATES PATENTS

| | | |
|---|---|---|
| 2,500,599 | Bergsteinsson et al. | Mar. 14, 1950 |
| 2,555,927 | Himel et al. | June 5, 1951 |
| 2,692,892 | Hillyer et al. | Oct. 26, 1954 |

OTHER REFERENCES

"Becco Research and Development Bulletin, No. 69," Becco Chemical Division of Food Machinery & Chem. Corp., Buffalo, N.Y.; original, October 1955; revised April 1956 (49 pages; pages 3 and 18 only needed).